Patented Mar. 1, 1938

2,110,010

UNITED STATES PATENT OFFICE 2,110,010

PROCESS OF SEPARATING BERYLLIUM COMPOUNDS FROM ALUMINUM COMPOUNDS

Charles E. White and Paul A. Parent, College Park, Md.

No Drawing. Application June 18, 1937, Serial No. 149,036

11 Claims. (Cl. 23—23)

This invention relates to a process of treating solutions containing beryllium and aluminum compounds, such as would result from the decomposition of the mineral beryl, whereby beryllium is obtained in a form free from aluminum, by the use of the reagent sodium hexametaphosphate.

The metal beryllium occurs in natural minerals with aluminum compounds, and in practice the mineral is heated, and treated with sulfuric acid, which converts the beryllium and aluminum compounds to sulfates, and, as these two elements are so much alike, it is difficult to separate them even at this stage.

The object of this invention is, therefore, to provide an improved, simplified, and inexpensive process for removing aluminum from aluminum and beryllium compounds.

The process consists in a preliminary aluminum removal, by adding to the solution containing aluminum and beryllium enough acid or alkali to adjust the acidity to the pH value 3.93 or less, which may be determined with a glass electrode. Having made this adjustment, 5.9 ml. of 10% sodium hexametaphosphate for each 0.1 g. $Al^{3+}$ present are slowly added with stirring. Of the many samples determined, one may be cited as an example. When 0.0845 g. $Al^{3+}$ were present with beryllium in a volume of 140 ml., at a pH of 3.93, on adding 5.0 ml. 10% sodium hexametaphosphate, 59% of the aluminum is precipitated as a basic metaphosphate. A small beryllium loss is experienced here, which represents about 2% of the total. The aluminum removal at this pH is always about 60%. The optimum quantity of hexametaphosphate is determined by adding the reagent until no more precipitate forms. An excess will redissolve the precipitate. The precipitate obtained by the process outlined above is filtered, washed and discarded. The filtrate is now treated to obtain complete aluminum removal, as follows:

The filtrate is made more alkaline by the addition of alkali until the pH drops to 4.7, and 1.2 ml. of 10% sodium hexametaphosphate are added for each 0.1 g. $Al^{3+}$ originally present. With, or without filtering, the solution or mixture is again made more alkaline—to a pH of 5.0 or slightly greater, and 0.6 ml. 10% sodium hexametaphosphate are now added for each 0.1 g. $Al^{3+}$ originally present. All but minute traces of aluminum are now precipitated, but an appreciable amount of the original beryllium is also precipitated, so that the precipitates obtained at pH 4.7 and at pH 5.0 must be united and saved for further treatment. This may be accomplished by filtering the mixture at pH 4.7 and again at pH 5.0, or simply filtering at the pH 5.0. The precipitates obtained here are washed with water.

The filtrate, now free of aluminum is treated with either sodium hydroxide, or ammonium hydroxide until alkaline. A slight excess may be necessary for complete precipitation. Filtration will be speeded up if this precipitation is carried out at the boiling temperature. Beryllium hydroxide free from aluminum, but containing beryllium metaphosphate, is precipitated. The yield of beryllium is 60–65% of the original.

It is important that the precipitates obtained at pH 4.7 and 5.0 be worked up again, because they contain about 30% of the original beryllium. These precipitates may be added to a new solution containing beryllium and aluminum, and hence but little loss of beryllium experienced, or they may be worked up as follows:

The precipitates are dissolved in weak acid, about 1 M acid, and the pH is adjusted to 3.93 by slowly adding alkali. The preliminary aluminum removal is made by adding 40% of the original amount of 10% sodium hexametaphosphate used in the initial aluminum removal.

The mixture is filtered, the precipitate washed with water, and the precipitate discarded.

The filtrate is adjusted to pH 4.7 and 0.5 ml. of 10% sodium hexametaphosphate added. The pH is now adjusted to 5.0 and 0.25 ml. of 10% sodium hexametaphosphate added for each 0.1 g. $Al^{3+}$ originally present. All the aluminum has now been removed.

The precipitates are filtered and discarded unless one prefers to work them up again for beryllium.

The filtrate is made alkaline with sodium or ammonium hydroxide; this may be done in the cold or at the boiling temperature. Beryllium hydroxide, containing metaphosphate, but free of aluminum, is obtained. About 20–25% of the original beryllium is obtained here. This combined with the first yield results in a total yield of 85–88% of the original beryllium.

If desired, one may simply combine what is described here as a "preliminary aluminum removal" at the pH 3.93, with the Gmelin method of boiling the sodium hydroxide solution of the hydroxides of aluminum and beryllium. This would be carried out by removing 59% of the aluminum at the pH 3.93 by adding the specified amount of sodium hexametaphosphate reagent, filtering and treating the filtrate with concentrated sodium hydroxide drop by drop until the last drop causes resolution of the precipitated hydroxides of aluminum and beryllium, then diluting and boiling. Beryllium hydroxide in 86% yield, free of aluminum and almost entirely free of phosphate or metaphosphate, is precipitated.

It will be understood that changes may be made in the process without departing from the spirit of the invention. One of which changes may be in the use of slightly different amounts of the various products used in the different processes, another may be in the omission of any step in the process, and the substitution of any other process therefor, and still another may be in the use of any additional substances in combination for accomplishing various other results.

The process will be readily understood from the foregoing description, and it will be noted that any part thereof may be used independent of any other part, so that any amount of aluminum may be removed, and substantially all, or any part of the beryllium may be recovered, and the process may be repeated as many times as may be desired, or additional steps may be added to save substantially all of the beryllium, or to purify the same.

Having thus fully described the invention, what we claim as new, and desire to secure by Letters Patent, is:

1. A process of precipitating about 59% of the aluminum from a solution containing aluminum and beryllium dissolved in a strong acid by adjusting the pH to about 3.93, and then adding sufficient sodium hexametaphosphate to precipitate the stated quantity of aluminum.

2. A process of precipitating about 59% of the aluminum from an acid solution containing aluminum and beryllium by adjusting the pH to about 3.93, and then adding sodium hexametaphosphate in the proportion of about 5.9 ml. of a 10% solution for each 0.1 gram of $Al^{+++}$ present.

3. A process of separating the major part of the aluminum from acid solutions containing aluminum and beryllium at a pH of about 3.93 by adding sodium hexametaphosphate, in the proportion of about 5.9 ml. of a 10% solution for each 0.1 gram of $Al^{+++}$ present, then filtering and treating the filtrate to obtain complete aluminum removal, by adding alkali to the filtrate until a pH near 4.7 is reached, then adding sodium hexametaphosphate in the proportion of about 1.2 ml. of a 10% solution for each 0.1 gram of $Al^{+++}$ in the original solution; then further increasing the pH to about 5.0 and again adding sodium hexametaphosphate in the proportion of about 0.6 ml. of a 10% solution for each 0.1 gram of $Al^{+++}$ originally present.

4. The process of separating the major part of the aluminum from acid solutions containing aluminum and beryllium which comprises treating the solution at the pH near 3.93 with sodium hexametaphosphate in the proportion of about 5.9 ml. of a 10% solution for each 0.1 gram of $Al^{+++}$ present, then treating the filtrate at the pH near 4.7, and again at the pH near 5.0 with the same reagent, in the respective proportion of about 1.2 ml. and 0.6 ml. of 10% solution for each 0.1 gram of $Al^{+++}$ originally present, to obtain complete aluminum removal, then treating the filtrate with alkali until the beryllium remaining in solution is completely precipitated.

5. The process of working up the precipitates, as described in claim 4, obtained at the pH near 4.7 and a pH near 5.0 to recover the major part of the beryllium contained in them, which comprises dissolving said precipitates in cold acid, precipitating the major part of the aluminum by means of sodium hexametaphosphate, in the approximate proportion of 2.4 ml. of a 10% solution for each 0.1 gram of aluminum originally present, at a pH near 3.93; filtering, and after filtering, treating the filtrate at a pH near 4.7 and again at a pH near 5.0 with more sodium hexametaphosphate, in the respective approximate proportions of 0.5 and 0.25 ml. of the 10% reagent for each 0.1 gram of $Al^{+++}$ in the original, until the aluminum is completely removed, then treating the filtrate from this last precipitation with alkali to precipitate the beryllium in a form free of aluminum.

6. The process of working up the precipitates, as described in claim 4, obtained at the pH near 4.7 and the pH near 5.0 again, to recover the major part of the beryllium contained in them, which comprises dissolving said precipitates in acid, precipitating the major part of the aluminum by means of about 2.4 ml. of a 10% sodium hexametaphosphate solution for each 0.1 gram of $Al^{+++}$ originally present at the pH near 3.93; filtering, treating the filtrate at the pH near 4.7, and again at pH near 5.0, with about 0.5 ml. and 0.25 ml. respectively of 10% sodium hexametaphosphate solution for each 0.1 gram of $Al^{+++}$ originally present until the aluminum is completely removed, and treating said filtrate, from these last precipitations, with alkali to precipitate the beryllium in a form free of aluminum, and also treating the last precipitates obtained at the pH near 4.7 and pH near 5.0 for recovering more beryllium free of aluminum.

7. The process which consists in removing the major part of the aluminum from an acid solution of beryllium and aluminum by precipitation with sodium hexametaphosphate, in the approximate proportion of 5.9 ml. of the 10% reagent for each 0.1 gram of $Al^{+++}$ present, filtering, and treating the filtrate with concentrated alkali solution, until the hydroxides of aluminum and beryllium which form just redissolve, then, filtering off any undissolved iron and diluting the filtrate which contains beryllium and aluminum, and boiling the same for a short time, whereby beryllium hydroxide free of aluminum and containing only traces of phosphate is precipitated.

8. The process of separating aluminum from beryllium in acid solutions of the two which comprises precipitating substantially all of the aluminum by the addition of sodium hexametaphosphate.

9. The process of separating aluminum from solutions containing aluminum and beryllium, which consists in adding to the solution a sufficient quantity of acid or alkali to adjust the acidity to the pH value of approximately 3.93, then slowly adding sodium hexametaphosphate in the proportion of about 5.9 ml. of a 10% solution for each 0.1 gram of $Al^{+++}$ present while stirring, filtering the precipitate obtained, adding alkali to this filtrate until the pH drops to 4.7, and adding 1.2 ml. of 10% sodium hexametaphosphate for each 0.1 g. $Al^{+++}$ originally present, filtering, making the solution more alkaline, to a pH of 5.0, adding 0.6 ml. 10% sodium hexametaphosphate for each 0.1 g. $Al^{+++}$ originally present; treating the filtrate, now free of aluminum, with sodium hydroxide until alkaline, whereby the beryllium hydroxide, along with some beryllium metaphosphate, is precipitated.

10. The process as described in claim 9, characterized in that the precipitates obtained at pH 4.7 and pH 5.0 are filtered at pH 4.7 and again at pH 5.0, and the precipitate obtained therefrom is washed with water.

11. The process of separating aluminum from solutions containing aluminum and beryllium, which consists of adding to the mixture a sufficient quantity of acid or alkali to adjust the acidity to the pH value of approximately 3.93, then slowly adding a sufficient quantity of the sodium hexametaphosphate to precipitate about 60% of the aluminum, filtering the said precipitate and adding alkali to the filtrate until a pH of approximately 5.0 is reached and adding sodium hexametaphosphate to precipitate the remainder of the aluminum, said mixture being filtered and beryllium compounds recovered from the filtrate by precipitation with alkali.

CHARLES E. WHITE.
PAUL A. PARENT.